June 2, 1964  J. SCARF  3,135,373
ARTICLE FEEDING APPARATUS
Filed Nov. 1, 1962  3 Sheets-Sheet 2

United States Patent Office 3,135,373
Patented June 2, 1964

3,135,373
ARTICLE FEEDING APPARATUS
Jack Scarf, Leeds, England, assignor to The Forgrove Machinery Company Limited, Leeds, England, a company of Great Britain
Filed Nov. 1, 1962, Ser. No. 234,672
Claims priority, application Great Britain Nov. 3, 1961
8 Claims. (Cl. 198—25)

It is known to feed articles in succession to a wrapping machine by means of article feeding apparatus comprising a rotary horizontal feed disc formed with circumferentially spaced article-receiving pockets, and an elevator which operates to lift the articles in succession from the pockets in the disc and deliver them to the wrapping machine.

Such feeding apparatus has long been in use for feeding confectionery tablets to a wrapping machine and in the conventional wrapping machine the feed disc and the elevator operate intermittently, the elevator lifting a tablet from a pocket in the feed disc during each period of dwell of the feed disc. The intermittent operation of the parts places a limit on the speed of operation of the machine and the present invention has for its object to provide an improved form of article feeding apparatus which is capable of higher speeds of operation and in which the movements of the parts are continuous.

The invention accordingly provides an article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession with a component of movement in the direction of travel of the feed disc into the pockets to lift articles therefrom and then descend again and a continuously operating conveyor which carries the lifted articles away in a continuous procession and in a definite spaced relationship.

One embodiment of article feeding apparatus according to the invention will now be described in detail, by way of example, with reference to the accompanying diagrammatic drawing in which.

Figure 1:
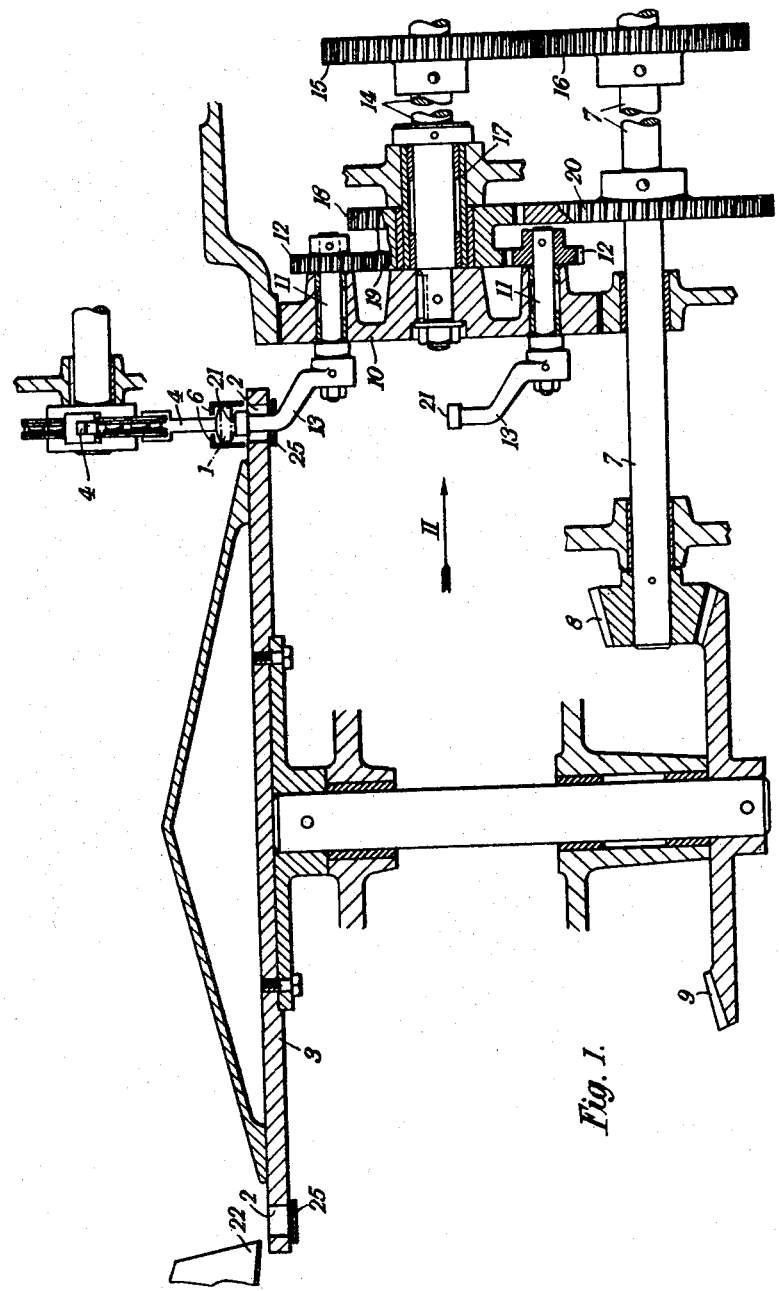
FIG. 1 is a vertical section through the feed disc and the elevator mechanism.
Figure 3:
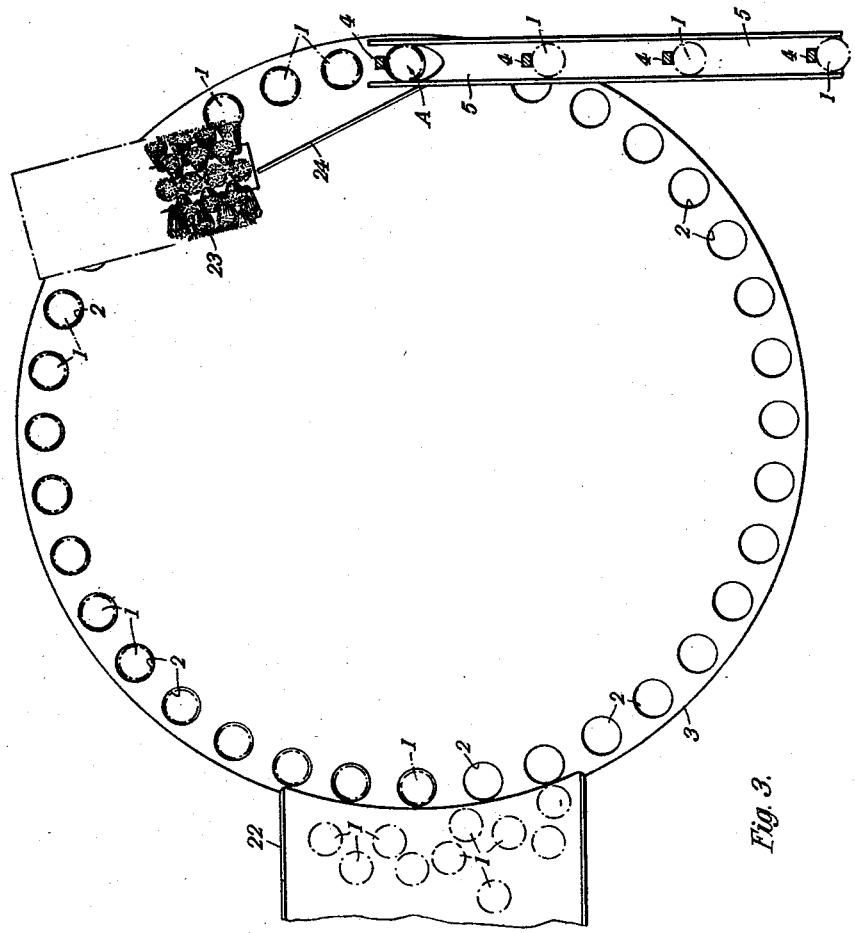
FIG. 3 is a plan view of the feed disc.

Confectionery tablets 1 are fed automatically to the circumferentially spaced pockets 2 of a continuously rotating feed disc 3 by conventional means, including a vibrating hopper 22, a rotary brush 23 (FIG. 3) and an associated guard rail 24. A support plate 25 (FIG. 1) supports the tablets contained in the pockets 2 and a peripheral side guard (not shown) surrounding the feed disc prevents the tablets from falling off the feed disc. A continuously operating elevator mechanism situated at a lifting station A lifts the tablets in succession from the pockets 2 into the path of downwardly depending lugs 4 carried by a continuously travelling conveyor chain. The lugs so carry the tablets 1 away to a wrapping mechanism (not shown) at a predetermined spacing along a channel 5 situated above the feed disc 3 and provided with top guides 6.

The tablets are positively controlled and correctly located by the lugs 4, which are pitched at regular intervals along the conveyor chain, and are thus delivered at precisely timed intervals to any suitable mechanism (e.g. a folding box) for effecting the wrapping operation.

The feed disc 3 is rotated continuously by a main drive shaft 7 via bevel gears 8 and 9. The shaft 7 also drives the elevator mechanism which consists of a drum 10 in which are rotably mounted a plurality of spindles 11 at equal circumferential spacing. A pinion 12 is fixed to one end of each spindle 11 and an elevator finger 13 is fixed to the other end. The drum 10 is keyed to a horizontal shaft 14 which is driven by the shaft 7 via gears 15 and 16.

Figure 2:
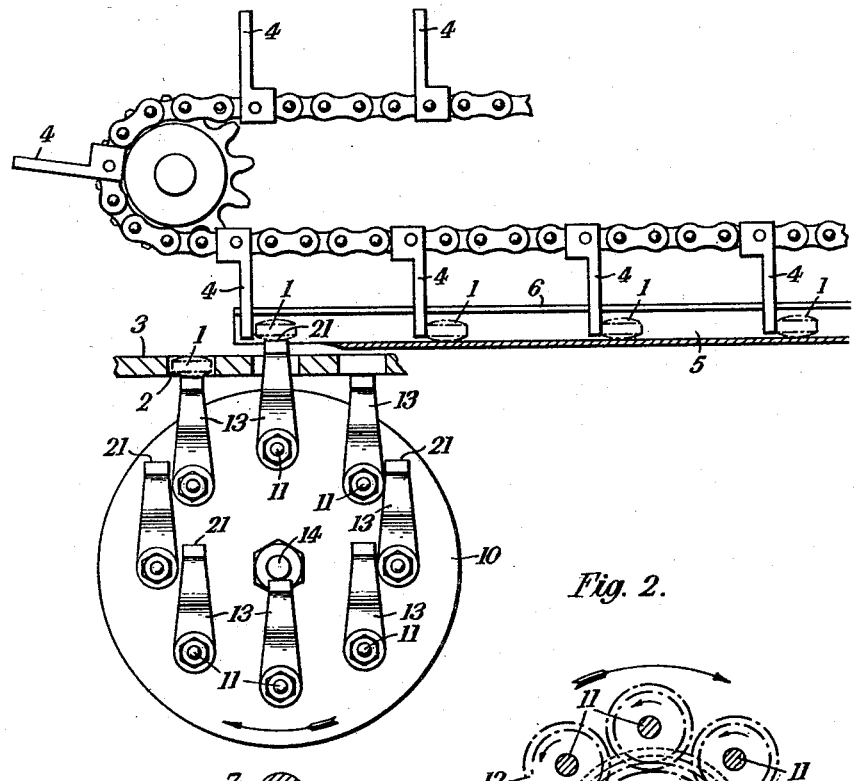
FIG. 2 is a view looking in the direction of the arrow II in FIG. 1.
Figure 4:
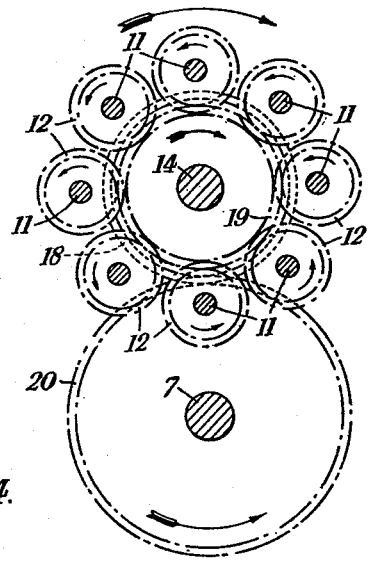
FIG. 4 is a diagram showing the arrangement of the gearing driving the elevator mechanism.

Rotatably mounted on a stationary sleeve 17, which constitutes a bearing of the shaft 14, is a compound gear 18, 19. The gear 18 is driven by by gear 20 on the shaft 7 and the gear 19 meshes with the pinions 12. The gear ratios are such that, as indicated in FIG. 4, the rotation of the drum 10 combined with the rotation in the same direction but at a higher speed of the gears 18, 19 causes the pinions 12 to rotate in the opposite direction to the drum 10 so as to compensate for the angular displacement of the fingers 13 as the drum rotates and so maintain the fingers 13 constantly in a vertical position as shown in FIG. 2. The top faces 21 of the fingers are therefore presented normally to the articles as they are lifted from the feed disc and describe, as they rise through the pockets 2, a circular path matching laterally the movement of the pockets during the transfer period. Owing to the fact that the elevator mechanism includes a number of lifting fingers 13, one of which is returning below the feed disc while another is completing its upward stroke, the maximum time is rendered available for lifting the tablets from the pockets and high speeds of operation can be achieved.

What I claim as my invention and desire to secure by Letters Patent is:

1. Article feeding apparatus comprising a horizontal feed disc formed with circumferentially spaced article-receiving pockets, means for imparting continuous rotation to the feed disc, a continuously operating elevator mechanism for engaging the articles in succession in the pockets which includes fingers which rise vertically in succession with a component of movement in the direction of travel of the feed disc into the pockets to lift articles therefrom and then descend again, a continuously operating conveyor means including spaced lugs engaging the articles lifted by said elevator to thereby carry the lifted articles away in a continuous procession and in a definite spaced relationship, and common drive means engaging said feed disc, said elevator mechanism and said conveyer means to move, thereby, them in synchronism.

2. Apparatus as claimed in claim 1, in which the elevator mechanism comprises a drum arranged to rotate continuously about a horizontal axis, a plurality of spindles rotatably mounted on the drum at equal circumferential spacing and each carrying an elevator finger, and gearing for rotating the spindles in a direction opposite to the direction of rotation of the drum and at a speed such that the fingers are maintained vertical as they rise through the pockets and then descend again.

3. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out of the pockets, said fingers having, as they pass through the pockets, a component of movement substantially in the direction of travel of the pockets, a conveyor channel arranged with its mouth adjacent the point of discharge of the articles from the pockets, and a continuously operating conveyor having means for transferring the successive articles from the successive fingers into the channel as they are lifted from the pockets and carrying them along the channel in a continuous procession and in a definite spaced relationship.

4. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out of the pockets, said fingers having, as they pass through the pockets, a component of movement substantially in the direction of travel of the pockets, a conveyor channel arranged with its mouth adjacent the point of discharge of the articles from the pockets, and a continuously travelling chain carrying downwardly depending lugs for transferring the successive articles from the successive fingers into the channel as they are lifted from the pockets and feeding them along the channel in continuous procession and in a definite spaced relationship.

5. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out of the pockets, said fingers having, as they pass through the pockets, a component of movement substantially in the direction of travel of the pockets, said elevator mechanism being mounted on a drum arranged to rotate continuously about a horizontal axis, a plurality of spindles being rotatably mounted on the drum at equal circumferential spacing and each carrying one of the elevator fingers, gearing being provided for rotating the spindles in a direction opposite to the direction of rotation of the drum and at a speed such that the fingers are maintained vertical as they rise through the pockets and then descend again out of the pockets, a conveyor channel arranged with its mouth adjacent the point of discharge of the articles from the pockets, and a continuously operating conveyor having means for transferring the successive articles from the successive fingers into the channel as they are lifted from the pockets and carrying them along the channel in a continuous procession and in a definite spaced relationship.

6. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out the pockets, said fingers having, as they pass through the pockets, a component of movement substantially in the direction of travel of the pockets, said elevator mechanism being mounted on a drum arranged to rotate continuously about a horizontal axis, a plurality of spindles being rotatably mounted on the drum at equal circumferential spacing and each carrying one of the elevator fingers, gearing being provided for rotating the spindles in a direction opposite to the direction of rotation of the drum and at a speed such that the fingers are maintained vertical as they rise through the pockets and then descend again out of the pockets, a conveyor channel arranged with its mouth adjacent the point of discharge of the articles from the pockets, and a continuously travelling chain carrying the downwardly depending lugs for transferring the successive articles from the successive fingers into the channel as they are lifted from the pockets and feeding them along the channel in continuous procession and in a definite spaced relationship.

7. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out of the pockets, said fingers having, as they pass through the pockets, a component of movement substantially in the direction of travel of the pockets, said elevator mechanism being mounted on a drum arranged to rotate continuously about a horizontal axis, a plurality of spindles being rotatably mounted on the drum at equal circumferential spacing and each carrying one of the elevator fingers, gearing, constituted by pinions on the spindles meshing with a gear driven from a shaft imparting rotation to the drum, for rotating the spindles in a direction opposite to the direction of rotation of the drum and at a speed such that the fingers are maintained vertical as they rise through the pockets and then descend again, a conveyor channel arranged with its mouth adjacent the point of discharge of the articles from the pockets, and a continuously operating conveyor having means for transferring the successive articles from the successive fingers into the channel as they are lifted from the pockets and carrying them along the channel in a continuous procession and in a definite spaced relationship.

8. Article feeding apparatus comprising a horizontal feed disc formed with circumferentially spaced article-receiving pockets, means for imparting continuous rotation to the feed disc, a continuously operating elevator mechanism for removing the articles in succession from the pockets which includes fingers which rise in succession along paths substantially parallel to the axes of the pockets into the successive pockets successively to lift articles therefrom and then descend again out of the pockets, said fingers having, as they pass through the pockets, a component of movement substantially in the direction of travel of the pockets, said elevator mechanism being mounted on a drum arranged to rotate continuously about a horizontal axis, a plurality of spindles being rotatably mounted on the drum at equal circumferential spacing and each carrying one of the elevator fingers, gearing, constituted by pinions on the spindles meshing with a gear driven from a shaft imparting rotation to the drum, for rotating the spindles in a direction opposite to the direction of rotation of the drum and at a speed such that the fingers are maintained vertical as they rise through the pockets and then descend again, the shaft imparting rotation to the drum being geared to another shaft imparting rotation to the feed disc, a conveyor channel arranged with its mouth adjacent the point of discharge of the articles from the pockets, and a continuously operating conveyor having means for transferring the successive articles from the successive fingers into the channel as they are lifted from the pockets and carrying them along the channel in a continuous procession and in a definite spaced relationship.

References Cited in the file of this patent

UNITED STATES PATENTS

| | | |
|---|---|---|
| 1,449,208 | Wood | Mar. 20, 1923 |
| 1,489,926 | Burtchaell | Apr. 8, 1924 |
| 2,152,107 | Thompson | Mar. 28, 1939 |
| 3,036,693 | Glocker | May 29, 1962 |